J. P. WAGNER.
Machine for Making Fire-Kindlers.

No. 204,464. Patented June 4, 1878.

Attest:
Geo. W. Tibbitts
Adam Herig

Inventor:
John P. Wagner

J. P. WAGNER.
Machine for Making Fire-Kindlers.
No. 204,464. Patented June 4, 1878.
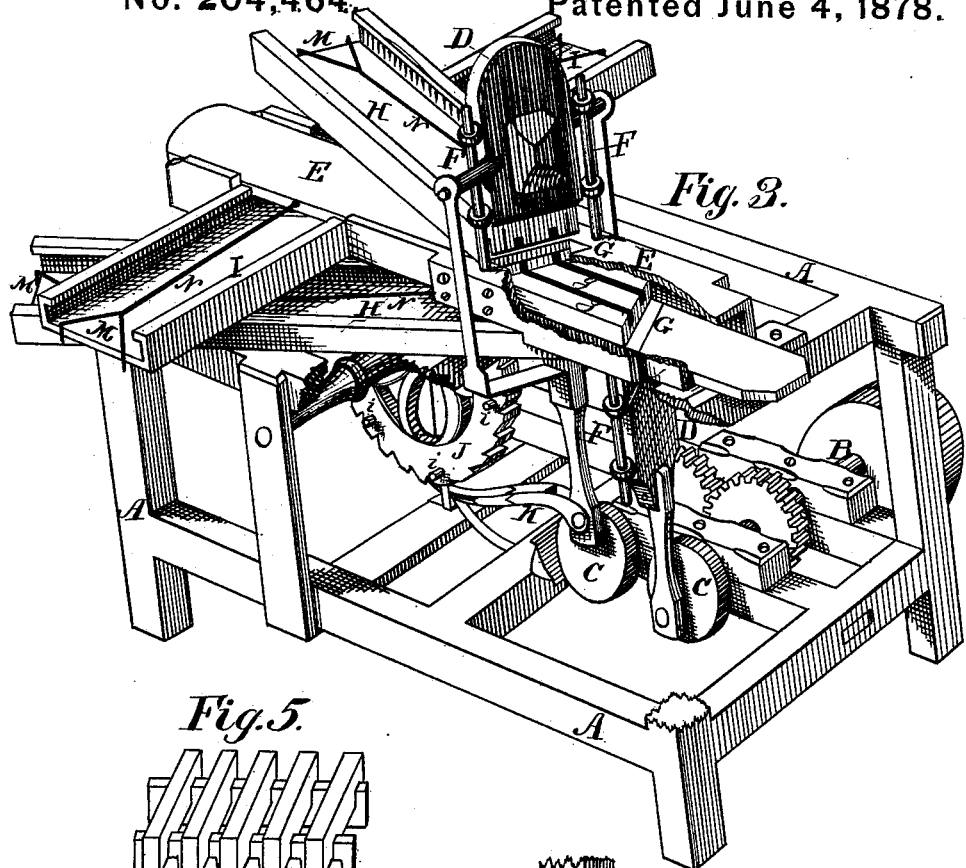
Fig. 3.
Fig. 5.
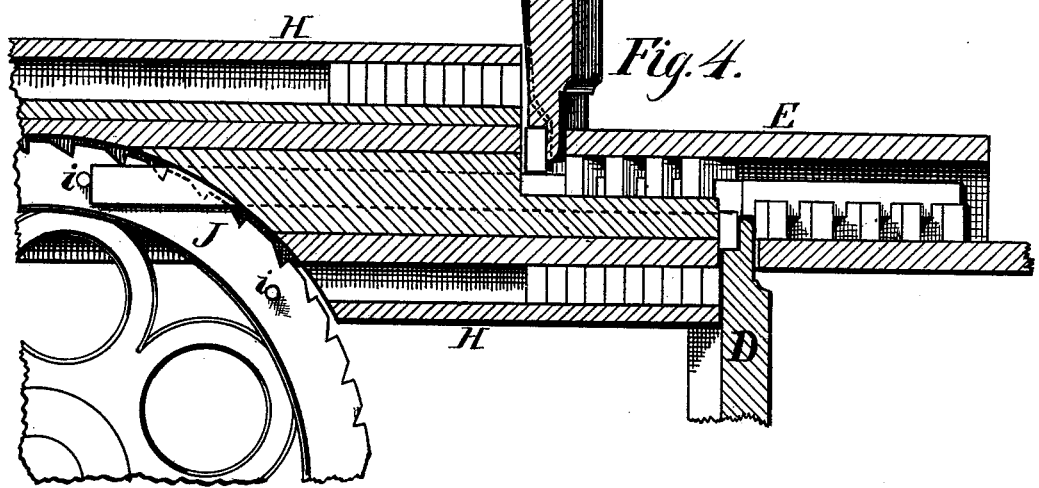
Fig. 4.
Attest:
Geo. W. Tibbitts
Adam Herig
Inventor:
John P. Wagner

UNITED STATES PATENT OFFICE.

JOHN P. WAGNER, OF CLEVELAND, OHIO.

IMPROVEMENT IN MACHINES FOR MAKING FIRE-KINDLERS.

Specification forming part of Letters Patent No. 204,464, dated June 4, 1878; application filed November 19, 1877.

*To all whom it may concern:*

Be it known that I, JOHN P. WAGNER, of Cleveland, in the county of Cuyahoga and State of Ohio, have invented a new and useful Machine for Making Fire-Kindlers, which invention is fully set forth in the following specification and accompanying drawings, in which—

Figure 1:
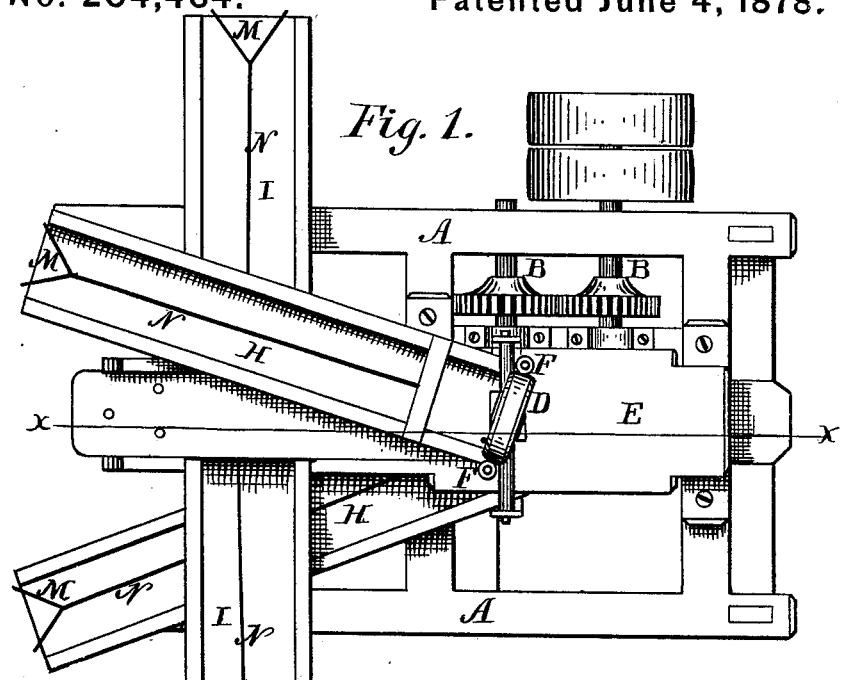
Figure 2:
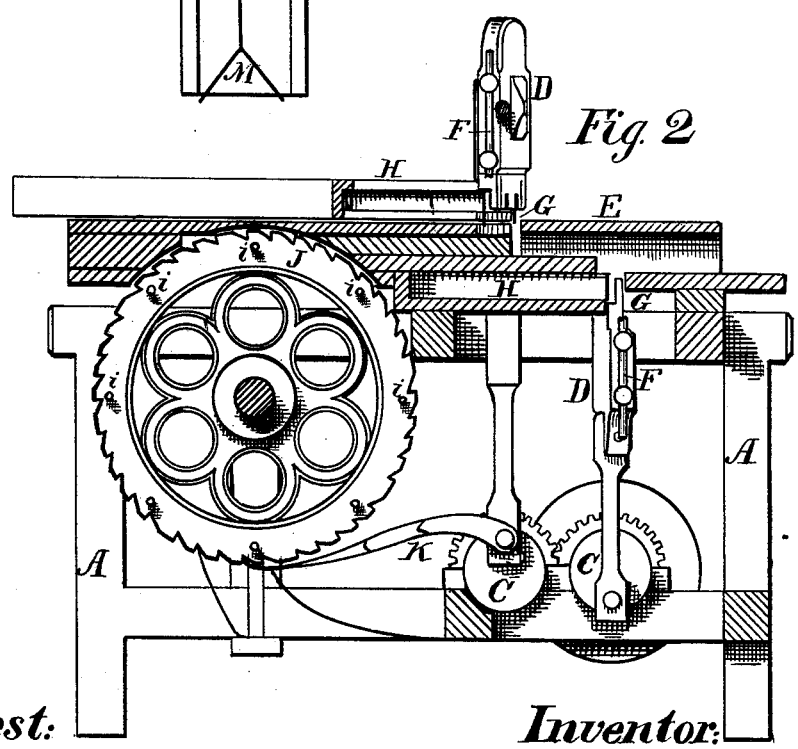

Figure 1 is a top or plan view. Fig. 2 is a vertical longitudinal section in line $x$ $x$ of Fig. 1. Fig. 3 is a perspective view, with portions broken away to show interior construction. Fig. 4 is a sectional view, showing the method of putting the pieces together composing the kindler. Fig. 5 is a perspective view of the kindler completed.

The object of my invention is to furnish a machine for making fire-kindlers in a very rapid manner; and consists of plungers which take previously-cut strips of wood fed to them in troughs and press them together onto the central connecting-strips in diagonal lines with each other, thus forming a diamond-shaped-frame fire-kindler, as seen in Fig. 5. The strips of wood are cut by circular saws, and conveyed directly into troughs attached to the machine, and which are provided with suitable feeding mechanism, and are then worked up, as stated.

In the drawing, A is a frame for supporting the working parts of the machine. B B are two shafts, having their bearings in the lower part of the frame, and are geared to revolve together. To one of said shafts are attached a tight and a loose pulley, by means of which motion is imparted to the machine. Upon the inner ends of said shafts are crank-wheels C C, carrying pitmen, which connect with and operate two plungers, D D. Upon the top of the frame A is placed a long box, E, into which the strips of wood for constructing the kindlers are conveyed. The plungers D D are arranged to operate upon slides F F, one below said box E and one above it. They are placed so as to work in diagonal lines across the box, and have their ends shaped with a rabbet of sufficient size to receive one of the strips of wood, and in their reciprocatory movement push the said strip through diagonal slots G G, one in the top and one in the bottom of said box E, and force them onto other central strips, which are fed through longitudinal slots $g$ $g$ in the central part of the box E. The strips which are thus caught by the plungers are fed to them in troughs H H, placed at an angle to the central line of the box E, and are connected therewith, one above and one below, as seen. The central strips upon which the two others are forced by the plungers are contained in two transverse troughs, I I, and are fed through the aforesaid longitudinal slots $g$ $g$ by means of pins $i$ $i$ on each side of a wheel, J. They are carried along in said slots by an intermittent movement of said wheel J, produced by a dog, K, attached to one of the crank-wheels C, and which engages with ratchet-teeth cut in the periphery of said wheel J. The said ratchet-teeth are made a sufficient distance apart and of sufficient number to move the said central strips along intermittingly, so that the upper and lower strips or pieces are attached to them at intervals, thus leaving spaces between them, and forming, when completed, the structure seen in Fig. 5.

In the several troughs are seen hooks M M, attached to elastic cords N N, which are designed to draw the strips forward as fast as they are taken up by the plungers. These hooks are moved back for relays as fast as the strips are consumed. The elastic cords may be substituted by cords, weights, and pulleys, if desired.

The operation of this machine is as follows: Common lath are the material from which the kindlers are made. They are sawed to the proper length with a circular saw, the mandrel of which is provided with two small saws, which cut the notches or gains in their edges, into which the edges of the central strips are forced by the plungers in putting them together. The strips, as fast as they are sawed, are pushed into the troughs H H, the saw-table being placed in close proximity thereto. The trough leading to the under side of the box E is intended to be made with a half-twist, so that the strips, as they are conveyed therein, are turned half over, in order to bring the edges having the notches uppermost before they arrive at the lower plunger.

To prevent the strips in the upper trough from falling over on their sides, the upper plunger is provided with two spring-guards, L L, against which the strips rest, but which yield as the plunger goes down.

Having described my invention, I claim as follows:

1. The plungers D D, arranged to operate reciprocally, in combination with the slotted box E, substantially as and for the purpose set forth.

2. The plungers D D, arranged to operate reciprocally, in combination with the slotted box E and the troughs H H I I, as and for the purpose specified.

3. The plungers D D, arranged to operate reciprocally, in combination with the slotted box E and the toothed wheel J, substantially as and for the purpose set forth.

4. In a machine for making fire-kindlers, the combination of the toothed wheel J, provided with pins $i\ i$, and the dog K with the slotted box E, whereby an intermittent movement is given to the central pieces comprising the kindler, resulting in attaching the several pieces together at intervals, as shown, and for the purpose set forth.

5. The elastic cords and hooks M M N N, in combination with the troughs H H and I I, substantially as and for the purpose set forth.

JOHN P. WAGNER.

Witnesses:
  GEO. W. TIBBITTS,
  ANDREW SQUIRE.